US011049060B2

(12) United States Patent
Wang et al.

(10) Patent No.: US 11,049,060 B2
(45) Date of Patent: Jun. 29, 2021

(54) OPERATING ENVELOPE RECOMMENDATION SYSTEM WITH GUARANTEED PROBABILISTIC COVERAGE

(71) Applicant: Hitachi, Ltd., Tokyo (JP)

(72) Inventors: Qiyao Wang, Los Gatos, CA (US); Haiyan Wang, Fremont, CA (US); Susumu Serita, San Jose, CA (US); Takashi Saeki, Sunnyvale, CA (US); Chetan Gupta, San Mateo, CA (US)

(73) Assignee: Hitachi, Ltd., Tokyo (JP)

( * ) Notice: Subject to any disclaimer, the term of this patent is extended or adjusted under 35 U.S.C. 154(b) by 80 days.

(21) Appl. No.: 16/428,141

(22) Filed: May 31, 2019

(65) Prior Publication Data

US 2020/0380447 A1 Dec. 3, 2020

(51) Int. Cl.
*G06Q 10/06* (2012.01)
*G06N 20/00* (2019.01)
*H04L 29/08* (2006.01)

(52) U.S. Cl.
CPC ....... *G06Q 10/06393* (2013.01); *G06N 20/00* (2019.01); *H04L 67/12* (2013.01)

(58) Field of Classification Search
None
See application file for complete search history.

(56) References Cited

U.S. PATENT DOCUMENTS

| 6,415,272 | B1 |  | 7/2002 | Ulyanov |  |
|---|---|---|---|---|---|
| 7,885,842 | B1 | * | 2/2011 | Bartolini | G06Q 10/06 709/226 |
| 9,092,741 | B1 | * | 7/2015 | Goparaju | G06N 20/00 |
| 2009/0192867 | A1 | * | 7/2009 | Farooq | G06Q 30/0201 705/7.29 |
| 2009/0204245 | A1 | * | 8/2009 | Sustaeta | H04L 67/125 700/99 |
| 2009/0312033 | A1 | * | 12/2009 | Shen | H04W 4/029 455/456.1 |

(Continued)

FOREIGN PATENT DOCUMENTS

EP 1985832 B1 10/2008

OTHER PUBLICATIONS

Extended European Search Report for related European Application No. 20162920.1 dated Sep. 17, 2020 (12 page).

(Continued)

*Primary Examiner* — Sujay Koneru
(74) *Attorney, Agent, or Firm* — Procopio, Cory, Hargreaves & Savitch LLP

(57) ABSTRACT

Example implementations described herein involve systems and methods involving a plurality of sensors monitoring one or more processes, the sensors providing sensor data, which can include determining a probability map of the sensor data from a database and a functional relationship between key performance indicators (KPIs) of the one or more processes and the sensor data; executing a search on the probability map to determine constrained and continuous ranges for the sensor data that optimize KPIs for the one or more processes based on the functional relationship; and generating a recommendation for the one or more processes that fit within the constrained and continuous range of the sensor data.

12 Claims, 9 Drawing Sheets

(56) References Cited

U.S. PATENT DOCUMENTS

| | | | |
|---|---|---|---|
| 2011/0061013 A1* | 3/2011 | Bilicki | G06Q 10/06393 |
| | | | 715/771 |
| 2014/0057627 A1* | 2/2014 | Hejazi | H04W 40/14 |
| | | | 455/424 |
| 2016/0103887 A1* | 4/2016 | Fletcher | H04L 41/22 |
| | | | 707/722 |
| 2016/0298447 A1* | 10/2016 | Mohaghegh | E21B 41/0064 |
| 2016/0364511 A1* | 12/2016 | Kirshner | G06F 17/11 |
| 2016/0381580 A1* | 12/2016 | Kwan | H04L 41/5009 |
| | | | 370/252 |
| 2017/0017896 A1* | 1/2017 | Hamann | G06N 20/20 |
| 2017/0064515 A1* | 3/2017 | Heikkila | H04W 4/021 |
| 2017/0309094 A1* | 10/2017 | Farahat | G07C 5/0841 |
| 2017/0351689 A1* | 12/2017 | Vasudevan | G06Q 10/0637 |
| 2017/0351959 A1* | 12/2017 | Rasheed | E21B 44/00 |
| 2018/0330300 A1* | 11/2018 | Runkana | G05B 15/02 |
| 2019/0179944 A1* | 6/2019 | Ungar | H04L 41/142 |
| 2019/0200363 A1* | 6/2019 | Rajendran | H04W 52/225 |
| 2019/0327124 A1* | 10/2019 | Lai | H04L 27/362 |
| 2019/0384255 A1* | 12/2019 | Krishnaswamy | G05B 19/4063 |
| 2020/0167691 A1* | 5/2020 | Golovin | G06N 7/005 |

OTHER PUBLICATIONS

Mammela, A. et al. "Multidisciplinary and Historical Perspectives for Developing Intelligent and Resource-Efficient Systems" IEEE Access, Mar. 16, 2018 (41 pages).

* cited by examiner

OPERATING ENVELOPE RECOMMENDATION SYSTEM WITH GUARANTEED PROBABILISTIC COVERAGE

BACKGROUND

Field

Example implementations described herein are generally directed to data-driven recommendation systems, and more specifically, directed to providing an operating envelope recommendation system with guaranteed probabilistic coverage.

Related Art

In the related art, there is a domain knowledge based approach for recommendation systems. For instance, pharmacists follow their experience and relevant documentations to determine the dosages. Operators commonly operate based on the requirements from equipment manuals. Such related art implementations are supported by expert opinion. However, such related art implementations may have several limitations. In some cases, there is no operating envelope available. Further, manufacturers may tend to provide an operating envelope that is too conservative on control variables. Although such implementations ensure that the accident rate or the shutdown rate is extremely low, the productivity may be far away from the optimal. In this case, a more reasonable operating envelope which can balance the accident rate and productivity better is needed.

In another related art implementation there is a machine learning based approach. This related art implementation utilizes classification algorithms to search the operating envelope based on data for both the key performance indicators (KPI) and the state variables. When the KPI is categorical, such as whether a system fails or not, then related art classification algorithms are used to find the mapping between the class label and the explanatory variables. Then the operating envelope is specified by the resulting classification boundary. Specifically, the mapping and operating envelope is directed to sets of explanatory variables which yield the 'good' group label.

When the KPI involves continuous variables, for instance, the profits or the time gap between two shutdowns, there is a need to bin the KPI into several categories. Choosing the number of bins as well as the location of the bins is important to the results, however, such values are usually set arbitrarily.

Machine learning based approaches discover the envelope from the Internet of Things (IoT) data available in the system to provide additional insights. However, this approach cannot guarantee the interpretability or the implementability of the detected envelope. The objective of classification algorithm is either to maximize the likelihood or the accuracy. Such algorithms do not take the interpretability or the implementability of the results into consideration.

SUMMARY

Example implementations described herein are directed to providing a general data-driven recommendation system to improve daily process operations, such as manufacturing, chemical processing, operating, policy making and so forth. Example implementations described herein are directed to the industrial setting, however, the example implementations can be applied to other settings according to the desired implementation.

FIG. 1 illustrates the relevant components and assumptions on their relations in the recommendation problem. With respect to FIG. 1, the following definitions are utilized. KPIs are random variables which quantify the performance of the system that is to be optimized. Control variables are a set of variables which directly or indirectly affect the KPI and can be set/changed by domain experts. State variables are a set of variables which cannot be set/changed directly, but may be related to the KPI. Different from control variables, state variables describe the system situation but are not controllable.

Based on these definitions, the recommendation problem of the example implementations in the present disclosure is to search for a region, called the operating envelope, in the control variable and/or state variable space such that the corresponding KPI values are higher/highest (assuming that higher KPI values indicate better outcomes). In practice, not all the three components mentioned above are attainable. Depending on which components are given, there can be several scenarios for the operating envelope identification problem.

In a first scenario KPI and state variables are given, while the control variables are not recorded or not easily quantifiable. The operating envelope problem is to identify good sets of values in the state variable space such that the corresponding KPI values are higher or highest compared with other regions. This recommendation provides domain experts valuable insights on which values of the state variables are good. Further, the experts can also use their domain knowledge to find the root cause more efficiently, which can happen in several practical use cases.

In a second scenario, the KPI and control variables are given, while the state variables are not. The operating envelope problem is to identify good control settings such that the resulting KPI are higher or highest. Such a recommendation provides a direct guideline for the domain experts. In a third scenario, the KPI, state variables and control variables are given, which does not occur often in practice.

The difference between state variables and control variables from the data modeling perspective is that state variables are random, and the control variables are deterministic. Accordingly, the example implementations for the second scenario can be a simpler version of that for the first scenario. Example implementations described herein focus on the first scenario, however, they can be easily extended to the other two situations with some modifications in accordance with the desired implementation.

This operating envelope identification problem has been known in the art. However, two aspects are missed by related art approaches. The first one is the interpretability of the resulting envelope, as the resulting recommendation may contradict with expert intuition. The related art approaches do not put any continuity constraints on the targeting operating envelope. Specifically, suppose there are three state variables denoted as a, b, c, and the operating envelope is to be identified in the space spanned by these three state variables. The solution of the related art operating envelope approach may indicate that state variable ($a_0$, $b_0$, $c_0$) and ($a_0+0.2$, $b_0$, $c_0$) are good operations that are inside of the envelope, but the value in-between ($a_0+0.05$, $b_0$, $c_0$) is a bad operation that is outside of the envelope. This kind of recommendation may not make sense to domain experts or customers. The second one is the implementability of the recommendation. The related art operating envelope definition does not take the implementability of the results into consideration and therefore, the recommendation may not be implementable in practice.

Example implementations described herein involve a data-driven solution to the operating envelope identification problem, with both interpretability and implementability ensured. To ensure the interpretability, example implementations consider the operating envelope in the form of a single continuous compact set or union of multiple disjoint compact sets in the state variable space. FIG. 2 illustrates an example of the targeting operating envelope when there are two state variables and three disjoint compact sets considered, in accordance with an example implementation. In this way, the discontinuity of recommendation will not happen. To ensure the implementability of the recommendation, an additional constraint is utilized on the probabilistic coverage of the recommendation. Specifically, the example implementations described herein require the probability of state variables falling into the recommended region is greater than some pre-specified threshold. In the present disclosure, this shall be referred to herein as the operating envelope with probabilistic coverage constraint problem, which is a novel way of formulating the operating envelope problem. Customers and experts usually not only care about the potential impact of the recommendation, but also the interpretability and the implementability of data-driven solutions.

To solve the operating envelope with probabilistic coverage problem, example implementations mathematically translate the operating envelope with constraint problem into a constrained optimization problem. Specifically, example implementations attempt to maximize the region-wise mean KPI over all targeting regions (a single compact set or the union of multiple disjoint compact sets within the state variable space), given that the probability of a state variable observation falling into such kind of region is greater than some pre-specified threshold. The compact condition on the regions ensure the interpretability of the outputs. Further, the probability coverage requirement ensures the implementability of the detected envelope.

After formulating the problem in a mathematical way, example implementations utilize two modules to get the solution for the constrained optimization problem discussed above. The first module estimates the region-wise mean KPI as well as the corresponding probabilistic coverage for any given region. The second module searches over all candidate regions and outputs the optimal region.

For the first module, example implementations utilize two ways to achieve reasonable estimates for the related components. Aspects of these two methods are discussed in detail further herein.

For the second module, example implementations utilize a system to efficiently search over the constrained space by combining two existing methods, i.e., the penalty approach and the genetic algorithm. The penalty approach handles the constraint part, i.e., combining the objective part and the constraint part such that it becomes a traditional optimization problem with a single objective function. Then the genetic algorithm effectively searches the solution for the optimization problem. Example implementations can use other combinations of methods as well, such as the Lagrangian approach to handle the constraint and use the numerical gradient descent method to perform the global optimization.

Thus, example implementations utilize a new definition of the operating envelope identify problem, which ensures the interpretability and implementability of the resulted recommendation and mathematically formulate the proposed problem and provide a systematic way to solve the problem.

DETAILED DESCRIPTION

Figure 1:
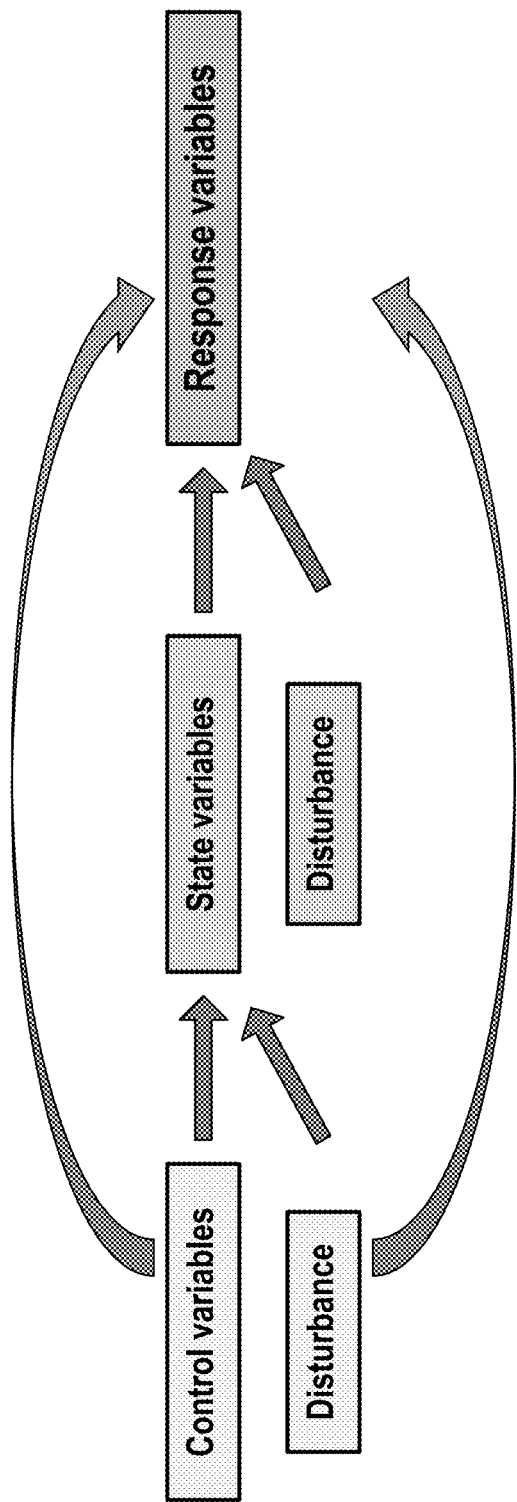
FIG. 1 illustrates an example of the recommendation problem.
Figure 2:
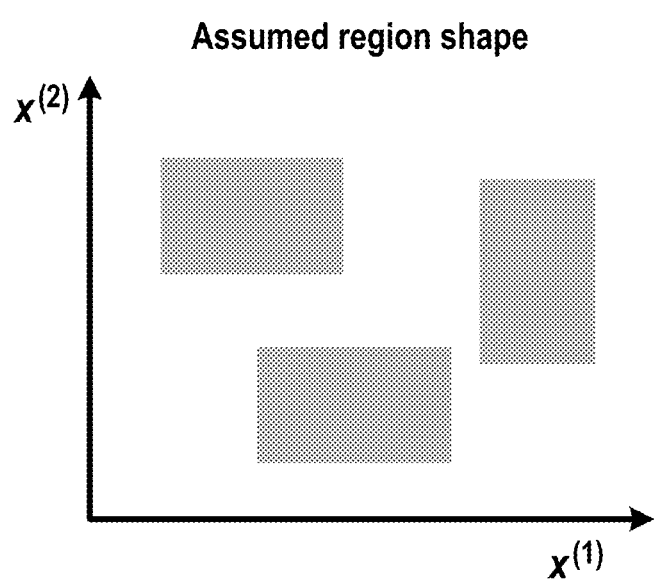
FIG. 2 illustrates an example of the targeting operating envelope when there are two state variables and three disjoint compact sets considered, in accordance with an example implementation.

The following detailed description provides further details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application. Selection can be conducted by a user through a user interface or other input means, or can be implemented through a desired algorithm. Example implementations as described herein can be utilized either singularly or in combination and the functionality of the example implementations can be implemented through any means according to the desired implementations.

Figure 3:
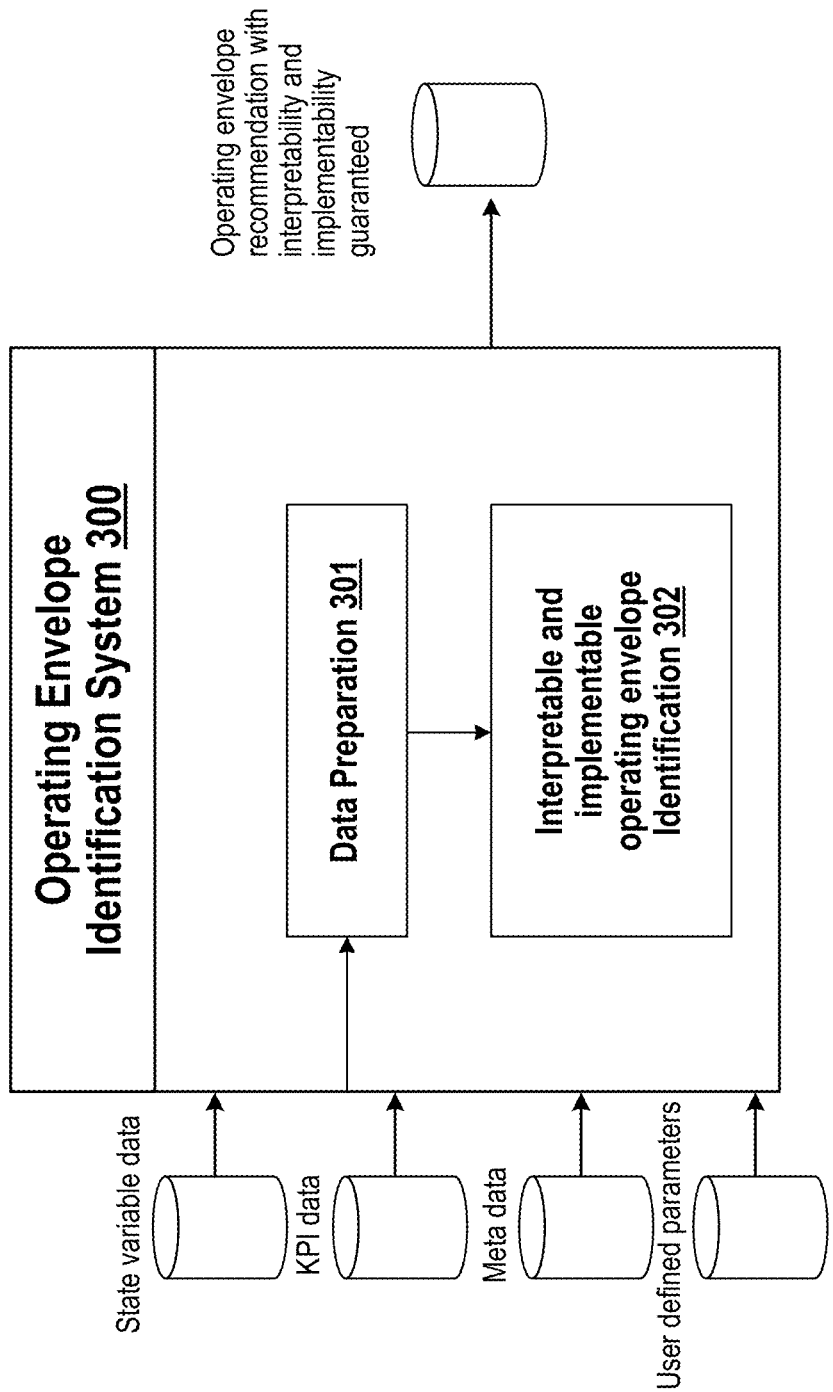
FIG. 3 illustrates an example operating envelope identification system, in accordance with an example implementation.

FIG. 3 illustrates an example operating envelope identification system 300, in accordance with an example implementation. The system receives the following types of data:

(a) State variable data: State variable data is historical data regarding the variables which may be related to the KPI that are of interest. For instance, in a manufacturing production line, all the sensor readings along the production of a product unit form a data instance in the state variable space. Such variables can be either continuous (e.g, surface temperature, twisting angels) or categorical variables (e.g., whether or not cleaning was done).

(b) KPI: For a given data point in the state variable space, there is a corresponding KPI value. For example, in the previously mentioned manufacturing example, the KPI is whether the resulting product is qualified. The KPI can also be continuous variables, such as the satisfactory score for some service, or the resulted profit and so forth.

(c) Metadata: Metadata involves data that describes the characteristic of the relevant variables. For example, the metadata may specify the valid range of a specific variable. As another example, the metadata may indicate which data points are valid and which are not. Invalid data can thereby be discarded in data analysis (e.g., 0 or 1 are meaningless data for state variable 10).

The system 300 may also utilize some user defined parameters as follows:

(a) Probabilistic coverage threshold: the probabilistic coverage threshold is the minimum probabilistic coverage requirement for the output from the operating envelope identification system. To be more specific, the threshold quantifies the minimum percentage of state variable points belonging to the detected region. This threshold can be any value between 0 and 1. Higher value indicates stricter coverage requirement. Accordingly, the resulted region will be wider.

(b) Number of disjoint regions: users can specify the structure of the output by telling the system how many disjoint regions they would like the system to output. This parameter can be any positive integer. Specifying multiple regions in the output can sometimes be important. For instance, the production may be conducted at multiple different operating modes. For each mode, we need to specify a region. This parameter is optional for the constrained operating envelope identification system. When it is not specified by the user, the system can try different numbers for this parameter and then user can choose the results based on their own needs.

The system 300 utilizes the following modules:

(a) Data preparation 301: The data preparation module 301 prepares the raw process data by transforming it into an appropriate format for data analysis, handling missing values and outliers, removing invalid data points, and so on. Further details of the data preparation module 301 are provided below.

(b) Interpretable and implementable operating envelope identification 302: The interpretable and implementable operating envelope identification module 302 first estimates the mean KPI and the probabilistic coverage for any given envelope, and then searches for the optimal envelope in the state variable space such that it produces the highest mean KPI among all regions which ensures both the interpretability and pre-specified implementability. Further details of the interpretable and implementable operating envelope identification 302 are provided below.

Data Preparation 301

There are a few steps involved in this data preparation module. The objective of the first step is to consolidate data from different sources and obtain data in a tabular format whose rows represent different observations and columns represent the state variables and the KPI variable. There are usually missing values, outliers, and invalid data in the process data. The objective of the second data preparation step is to handle these issues. The data preparation process proceeds as follows:

1. Use the observation identifier (ID) as the key variable to join data from different sources and then create the tabular format data.

2. For each column, i.e., each state variable or KPI variable, a. Based on information in the metadata set, count the number of meaningless data, denoted as $n_{meaningless}$.

b. Based on the outlier detection rule in statistics, using valid data only to count the number of outliers, denoted as $n_{outlier}$.

c. If the summation of $n_{meaningless}$ and $n_{outlier}$ is larger than a pre-specified threshold (e.g., 40% of the total number of units), then the column is deleted from the analysis. This is because there is not enough valid data contained in the column.

3. For each row, i.e., observation unit, check whether there exist valid data (i.e., not meaningless data and not outliers) for all remaining columns. Delete the rows with at least one invalid data.

Table 1 below shows a sample output of the data preparation process when KPI is a categorical variable.

TABLE 1

Sample data after data preparation when KPI is a categorical variable

| Observation ID | State variable 1 | ... | State variable P | KPI |
|---|---|---|---|---|
| 1 | 12.5 | ... | 100 | Pass |
| 2 | 11.1 | ... | 110 | Pass |
| 3 | 19.3 | ... | 109 | Fail |
| 4 | 9.9 | ... | 114 | Pass |
| ... | ... | ... | ... | ... |

Table 2 shows a sample output of the data preparation process when KPI is a numerical variable.

TABLE 2

Sample data after data preparation when KPI is a numerical variable

| Observation ID | State variable 1 | ... | State variable P | KPI |
|---|---|---|---|---|
| 1 | 12.5 | ... | 100 | 90 |
| 2 | 11.1 | ... | 110 | 89 |
| 3 | 19.3 | ... | 109 | 100 |
| 4 | 9.9 | ... | 114 | 65 |
| ... | ... | ... | ... | ... |

Interpretable and implementable operating envelope identification 302

This module provides a systematical way to output the interpretable and implementable operating envelope. It utilizes the following two components:

Estimation module performs estimation for the mean KPI as well as the probabilistic coverage for any given region of the shape pre-determined. Further details are provided with respect to FIGS. 4 and 5. Global searching module efficiently searches over all candidate regions and output the optimal one. Further details are provided with respect to FIG. 6. How these two modules work together to identify the operating envelope with interpretability and implementability ensured is illustrated with respect to FIG. 7.

The following mathematical notations are introduced herein. Assume that there are n pairs of observations for the KPI and state variables in total. The KPI of the i-th observation is $y_i$, and the P state variables of the i-th observation is $x_i = (x_i^{(1)}, \ldots, x_i^{(p)}, \ldots, x_i^{(P)})^T$ for $i=1, \ldots, n$. The targeting solution is of type $R = R_1 \cup \ldots R_l \ldots \cup R_L$. The L regions are mutually disjoint. Further, each of the regions is a rectangle compact set in the re space. Mathematically, $R_l = [r_{l1}^L, r_{l1}^U] \times \ldots \times [r_{lp}^L, r_{lp}^U] \times \ldots \times [r_{lP}^L, r_{lP}^U]$, with $r_{lp}^L$ and $r_{lp}^U$ are unknown and it $r_{lp}^L \in \mathbb{R}$, $r_{lp}^U \in \mathbb{R}$, with $r_{lp}^L < r_{lp}^U$. However, the example implementations are not limited to rectangle shaped regions; other definable regions can be utilized in accordance with the desired implementation.

Then the constrained operating envelope identification problem is that example implementations try to find region R for a given L which equals $$\max_{r_{11}^L, r_{11}^U, \ldots, r_{1P}^L, r_{1P}^U; \ldots; r_{L1}^L, r_{L1}^U, \ldots, r_{LP}^L, r_{LP}^U} E[y|X \in R]$$

subjecting to the following the constraint:

$$Pr = \text{Prob}(x \in R) \geq \beta. \quad 5$$

$\beta$ is probabilistic threshold described above.

Estimate Relevant Components

Given the raw data i.e, $(y_i, x_i)$ for $i=1, \ldots, n$, example implementations evaluate $E[y|x \in R]$ and $Pr$ for any given $R$, in order to implement the later global searching algorithm, example implementations utilize the following two methods.

In a first example implementation (shown in estimation module 400 of FIG. 4), there is a model based approach. At 401, the module intakes cleaned data from the process of data preparation 301 of FIG. 3, and estimates the mapping between KPI and state variables. It is assumed that there is a true mapping between the KPI y and the state variables x $$y = f(x) + \varepsilon,$$

where $\varepsilon$ denotes the random error with mean 0. At 402, the module also estimates the probabilistic distribution of the state variables from the data of data preparation 301. The probability density function of state variable x is $g(x)$. Then for any given region R, there is $$E[y | x \in R] = E[E[y | x] | x \in R] = E[f(x) | x \in R] = \frac{\int_R f(x) g(x)\, dx}{\int_R g(x) dx}$$

$$Pr = \int_R g(x) dx$$

$$Pr = \int_R g(x) dx$$

Based on these two formulas, any regression methods in machine learning can be utilized to achieve $\hat{f}(x)$ and multivariate kernel density estimations can be utilized to achieve $\hat{g}(x)$.

At 403, the module uses the two estimates obtained from 401 and 402 into the population definitions of mean KPI within R and the probability of falling into R. Example implementations estimate $E[y|x \in R] - c(\beta - Pr)^+$ by $$E[y|\widehat{x \in R}] - c(\beta - \widehat{Pr})^+$$

with $$E[y|\widehat{x \in R}] = \frac{\int_R \hat{f}(x) \hat{g}(x) dx}{\int_R \widehat{g(x)} dx}$$

$$\widehat{Pr} = \int_R \widehat{g(x)} dx$$

Figure 5:
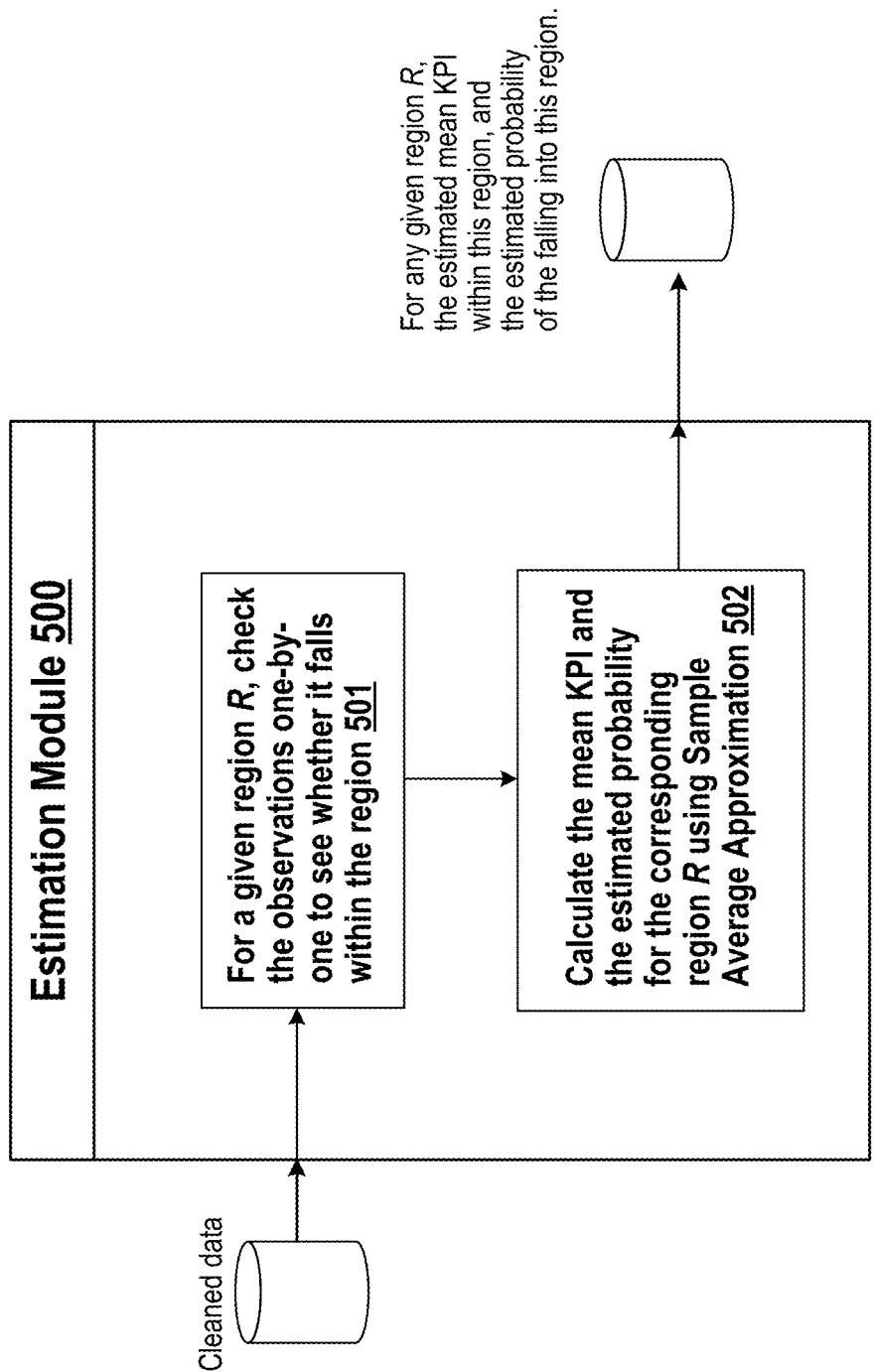

FIG. 5 illustrates an example estimation module which utilizes a Sample Average Approximation (SAA) which is grounded by the Central Limit Theory in statistics. At 501, for a given region R, the cleaned data is checked to determine if it falls within the region. At 502, for any region R, example implementations utilize the mean KPI for all observations within it to estimate $E[y|x \in R]$ and uses the proportion of observations belonging to region R to estimate $Pr$. Mathematical formulas are $$E[y|\widehat{x \in R}] = \frac{\sum_{i=1}^{n} I(x_i \in R) y_i}{\sum_{i=1}^{n} I(X_i \in R)}$$

$$\widehat{Pr} = \frac{\sum_{i=1}^{n} I(x_i^p \in [r_p^L, r_p^U])}{n}$$

The computational burden for the method becomes an issue when the dimension of the state variable space, i.e., P, becomes large; thus it is preferable to utilize the method of FIG. 5 when $P \geq 3$.

Figure 6:
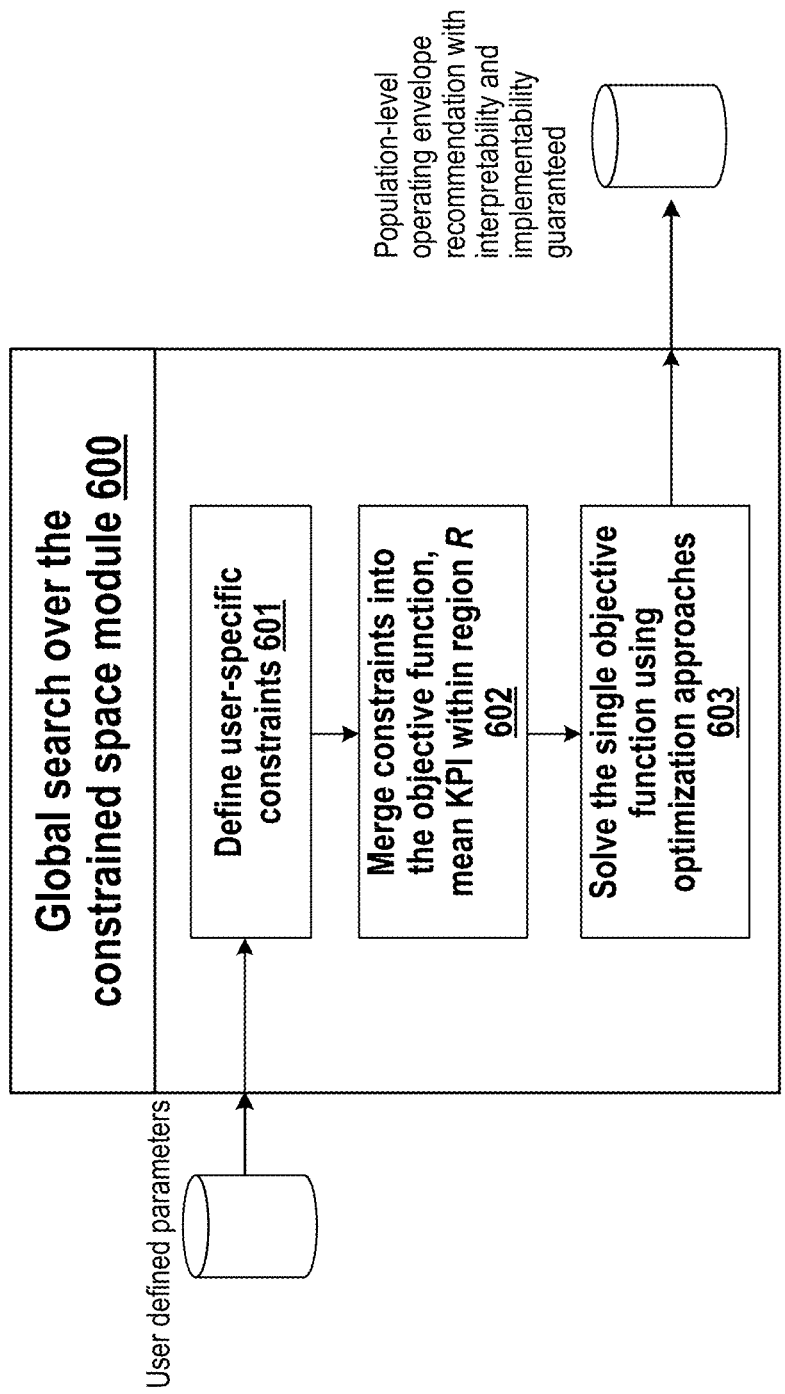
FIG. 6 illustrates the global search over the constrained state variable space, in accordance with an example implementation.

FIG. 6 illustrates the global search over the constrained state variable space, in accordance with an example implementation.

As illustrated in FIG. 6, the global search over the constrained space module 600 defines user specific constraints 601 from the cleaned data generated from data preparation 301. The process of solving the optimization problem with constraint proceeds as follows:

Merge the constraint into the objective function 602: the penalty approach is a good way to handle additional constraints in the field of optimization. Example implementations exploit this approach in the following way. The original optimization with constraint problem is equivalently transformed into:

$$\max_{r_{11}^L, r_{11}^U, \ldots, r_{1P}^L, r_{1P}^U; \ldots; r_{L1}^L, r_{L1}^U, \ldots, r_{LP}^L, r_{LP}^U} \{E[y|X \in R] - c^*(\beta - Pr)^+\},$$

where $(\beta - Pr)^+ = \max(0, \beta - Pr)$ and $c$ is the non-negative penalty multiplier. This means that a penalty of magnitude $c$ times the distance between $\beta$ and $Pr$ is placed when the constraint is not satisfied. It can be shown that the optimal solution of the original problem reaches at $$\max_{r_{11}^L, r_{11}^U, \ldots, r_{1P}^L, r_{1P}^U; \ldots; r_{L1}^L, r_{L1}^U, \ldots, r_{LP}^L, r_{LP}^U} \{E[y|X \in R] - c(\beta - Pr)^+\},$$

where $c^*$ is the minimal point of function $k(c)$ defined below $$k(c) = \max_{r_{11}^L, r_{11}^U, \ldots, r_{1P}^L, r_{1P}^U; \ldots; r_{L1}^L, r_{L1}^U, \ldots, r_{LP}^L, r_{LP}^U} \{E[y|X \in R] - c(\beta - Pr)^+\}.$$

Other methods such as the Lagrangian multipler approach can also be used to handle the constraint in our optimization problem, with detailed discussed further below.

Optimize the single objective function 603: genetic algorithm is an algorithm that can be utilized to solve optimization problems, which does not require the explicit formula of the objective function. The genetic algorithm tries to mimic natural processes. In example implementations, the genetic algorithm proceeds as follows:

Initiate a candidate population of size M: for $m=1, M$, denote the mth initialization as $r_{11,m}^L, r_{11,m}^U, \ldots, r_{1P,m}^L, r_{1P,m}^U; \ldots; r_{L1,m}^L, r_{L1,m}^U, \ldots, r_{LP,m}^L, r_{LP,m}^U$, and the region spanned by these values is denoted as $S_m$.

Evaluate the fitness (i.e, how good it is in terms of maximizing our objective function) of each initialized data point by the objective function $[y|x \in S_m] - c(\beta - \text{Prob}(x \in S_m))^+$. Check whether certain optimization criteria is met. For instance, the criteria can be, compared to the previous population, the increasement in the fitness is smaller than some threshold. If yes, output the best individual, and denote the solution as $R^* = [r_{l1}^{*L},$ $r_{l1}^{*U}] \times \ldots \times [r_{lp}^{*L}, r_{lp}^{*U}] \times \ldots \times [r_{lP}^{*L}, r_{lP}^{*U}]$. Otherwise, go the next step to produce new populations.

There are several steps in this new population producing process. First, the algorithm selects which individuals among the current population will produce offspring based on their fitness. Individuals with higher fitness value have higher chances to be selected. Next, an exchange step is performed among the selected parents to produce offspring. Specifically, for any two parents, some of the variables among $r_{11}^L, r_{11}^U, \ldots, r_{1P}^L, r_{1P}^U$; $\ldots$; $r_{L1}^L, r_{L1}^U, \ldots, r_{LP}^L, r_{LP}^U$ are exchanged. Finally, each of the produced offspring is mutated by certain perturbation with certain probability. Through these three steps, a new population of individuals with higher fitness values are created and the example implementations go back to the first step to improve the fitness further.

Figure 7:
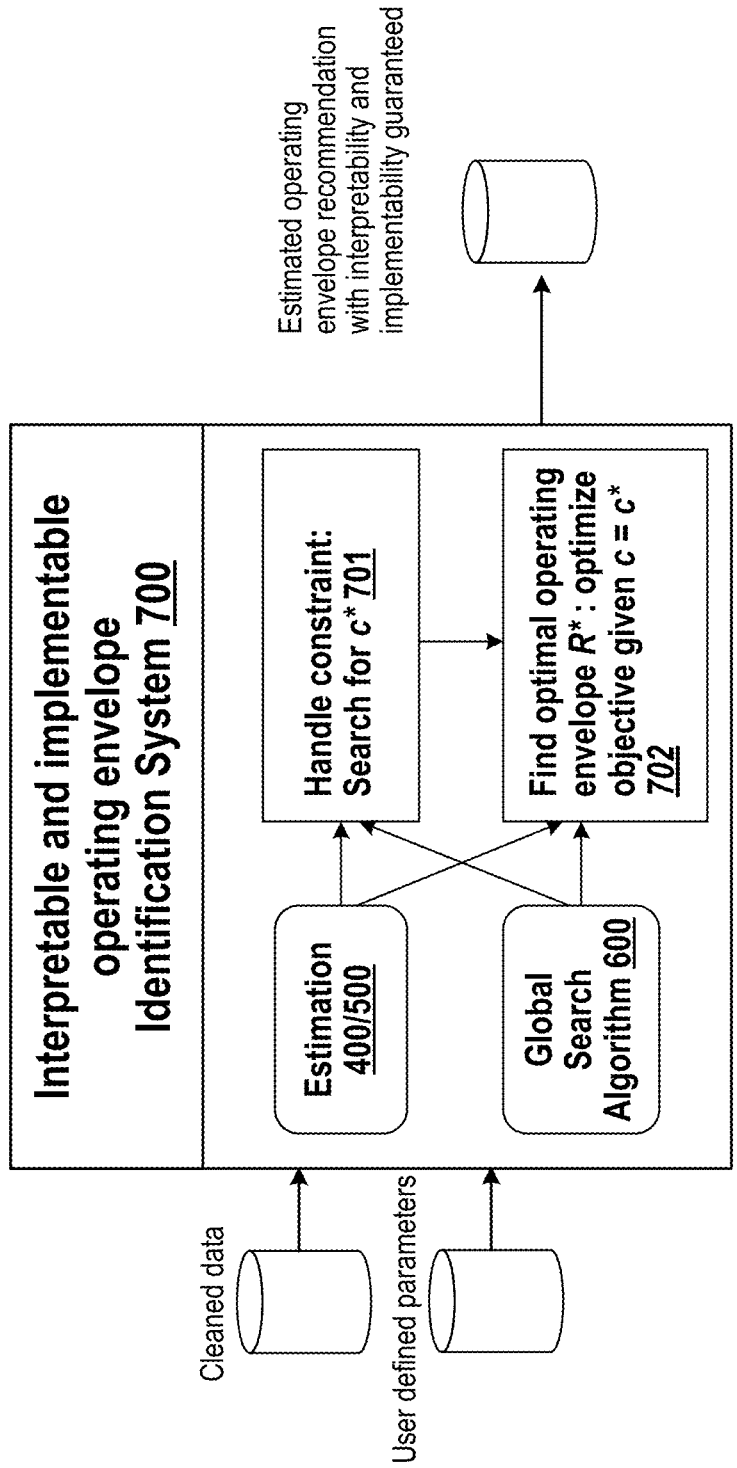
FIG. 7 illustrates the interpretable and implementable operating envelope identification system, in accordance with an example implementation.

FIG. 7 illustrates the interpretable and implementable operating envelope identification system, in accordance with an example implementation.

Figure 4:
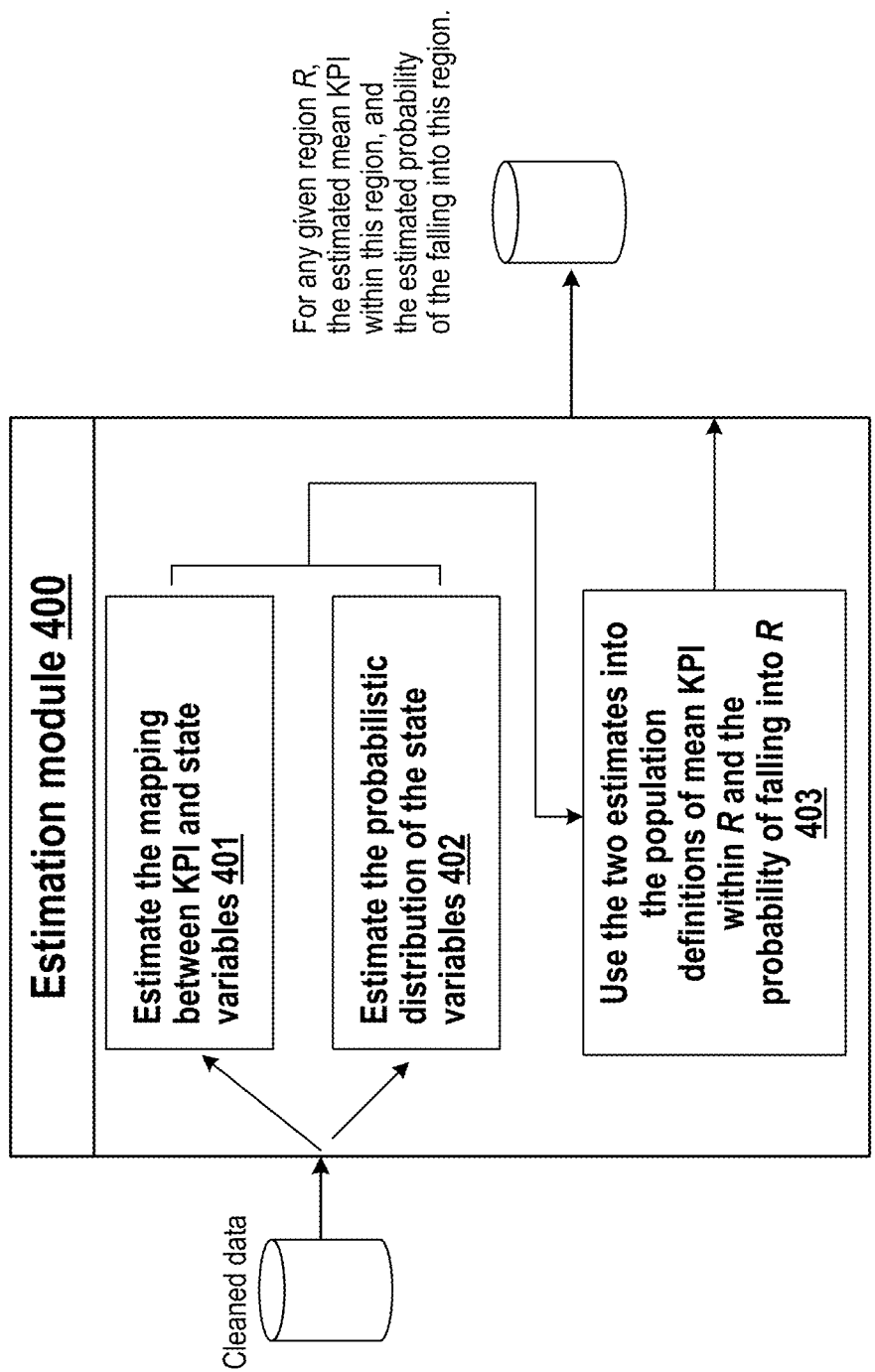
FIGS. 4 and 5 illustrate an example of the estimation module, in accordance with an example implementation.

The interpretable and implementable operating envelope identification system 700 combines the elements as described in FIGS. 3 to 6. How the elements discussed with respect to FIGS. 3-6 work together are as follows:

a) Handle the probabilistic constraint 701: as mentioned previously, the original constrained problem can be solve by optimizing a single objective function $[y|x \in R] - c^*(\beta - Pr)^+$, where c is the minimal of $k(c) = \max_{r_{11}^L, r_{11}^U, \ldots, r_{1P}^L, r_{1P}^U; \ldots; r_{L1}^L, r_{L1}^U, \ldots, r_{LP}^L, r_{LP}^U} \{E[y|X \in R] - c(\beta - Pr)^+\}$. Consequently, example implementations search for c* first, by trying a grid of c and find when k(c) is minimized. Along this process, example implementations use the estimation procedures as illustrated in FIGS. 4 and 5, and the optimization procedure in FIG. 6.

b) Find the optimal operating envelope 702: once the value of c* is obtained, example implementations can then find R* by using the estimation procedures and the genetic algorithm to find the solution for $\max_{r_{11}^L, r_{11}^U, \ldots, r_{1P}^L, r_{1P}^U; \ldots; r_{L1}^L, r_{L1}^U, \ldots, r_{LP}^L, r_{LP}^U} \{E[y|X \in R] - c^*(\beta - Pr)^+\}$.

As described above, the objective of the example implementations is to formulate a new operating envelope problem and provide a systematically solution and system to generate the optimal operating envelope. The system does not need to stick to any specific mathematical algorithms. For example, alternative formats/solutions for the components in the system can be utilized in example implementations as follows.

(a) The shape of the targeting regions: example implementations can consider other types of shapes as well, if the shape can be parametrized easily. For instance, the sphere is one of the alternative shapes that can be considered, as it can be represented by the center and the radius. The ellipsoid is also an option, as it can also be parameterized easily.

(b) Estimation methods: example implementations provided two methods to perform estimation. User can choose based on their real practice.

(c) Optimization of a function over continuous space: besides the genetic algorithm approach, example implementations can also use derivative based approaches such as the numerical gradient descent algorithm.

(d) Constraint handling method: in additional to the penalty method, people can also use other methods to handle the constraint, including the Lagrangian method, and so on in accordance with the desired implementation.

Figure 8:
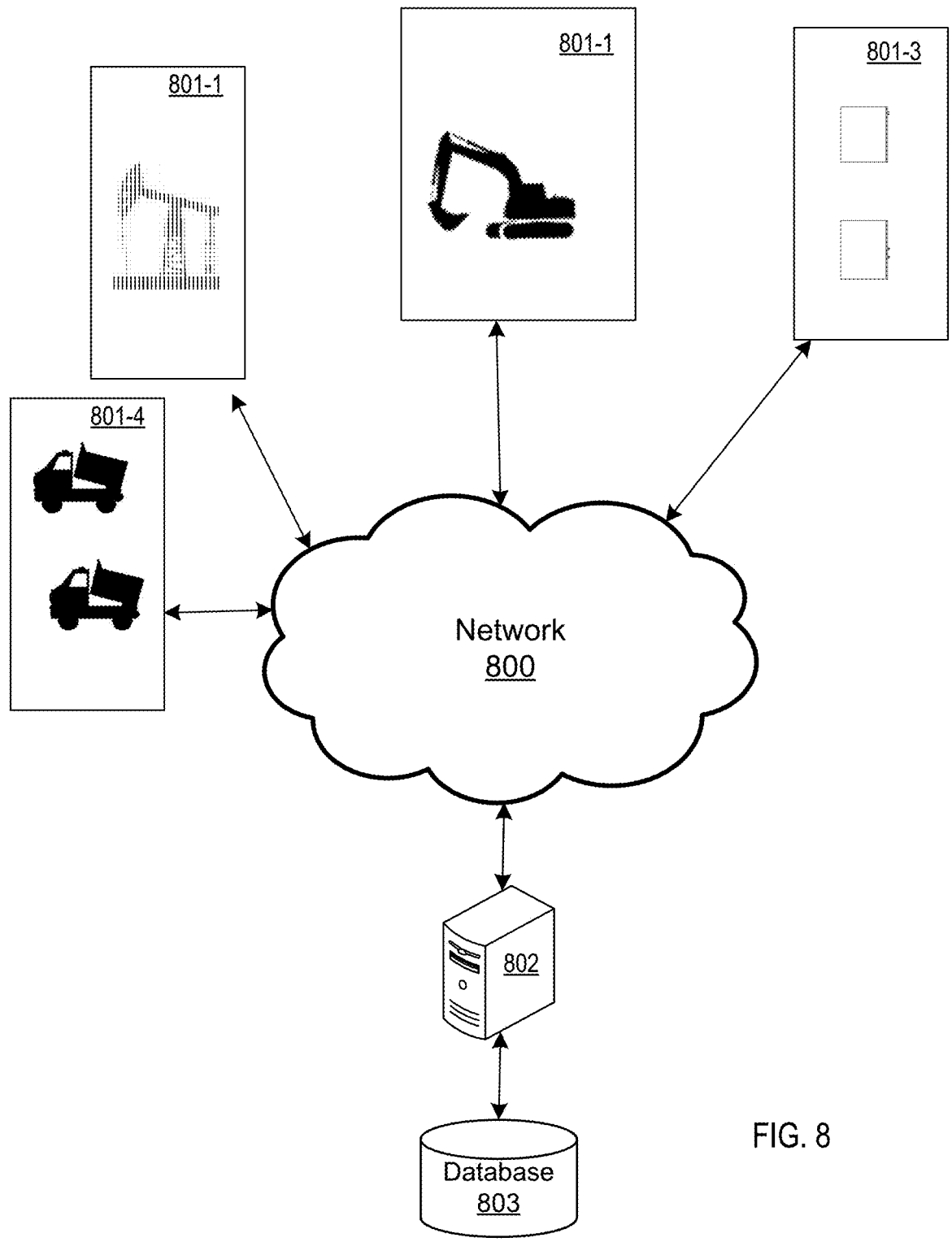
FIG. 8 illustrates a system involving a plurality of apparatuses with sensors, and a managing apparatus that manages the industrial processes for the plurality of apparatuses, in accordance with an example implementation.

FIG. 8 illustrates a system involving a plurality of apparatuses and a management apparatus, in accordance with an example implementation. One or more apparatuses or apparatus systems 801-1, 801-2, 801-3, and 801-4 are communicatively coupled to a network 800 which is connected to a management apparatus 802. The management apparatus 802 manages a database 803, which contains historical data collected from the apparatuses and apparatus systems in the network 800. In alternate example implementations, the data from the apparatuses and apparatus systems 801-1, 801-2, 801-3, and 801-4 can be stored to a central repository or central database such as proprietary databases that data from equipment or equipment systems such as enterprise resource planning systems, and the management apparatus 802 can access or retrieve the data from the central repository or central database. Such apparatuses can include stationary apparatuses such as coolers, air conditioners, servers, as well as mobile apparatuses such as automobiles, trucks, cranes, as well as any other apparatuses that facilitate industrial processes. Each of the apparatuses or apparatus systems 801-1, 801-2, 801-3, 801-4 can be associated with sensors that provide sensor data associated with their underlying industrial processes.

Related art implementations that utilize machine learning processes to optimize parameters for facilitating industrial processes often end up with discontinuous and non-implementable recommendations for industrial process. For example, a machine learning algorithm may attempt to optimize a KPI for a furnace (e.g., maximizing yield for a smelting process), and the recommendation result from the machine learning process may be something not implementable (e.g., keep temperature at 300 degrees for 3.2 seconds, then 310 degrees for 5 seconds, then 295 degrees for 4 seconds). Through the example implementations described herein, the constraints may thereby generate an operating envelope that imposes a continuous and constrained range of operation, which yields a recommendation that can thereby be implementable (e.g., keep temperature between 295 degrees and 310 degrees for at least 12 seconds).

Figure 9:
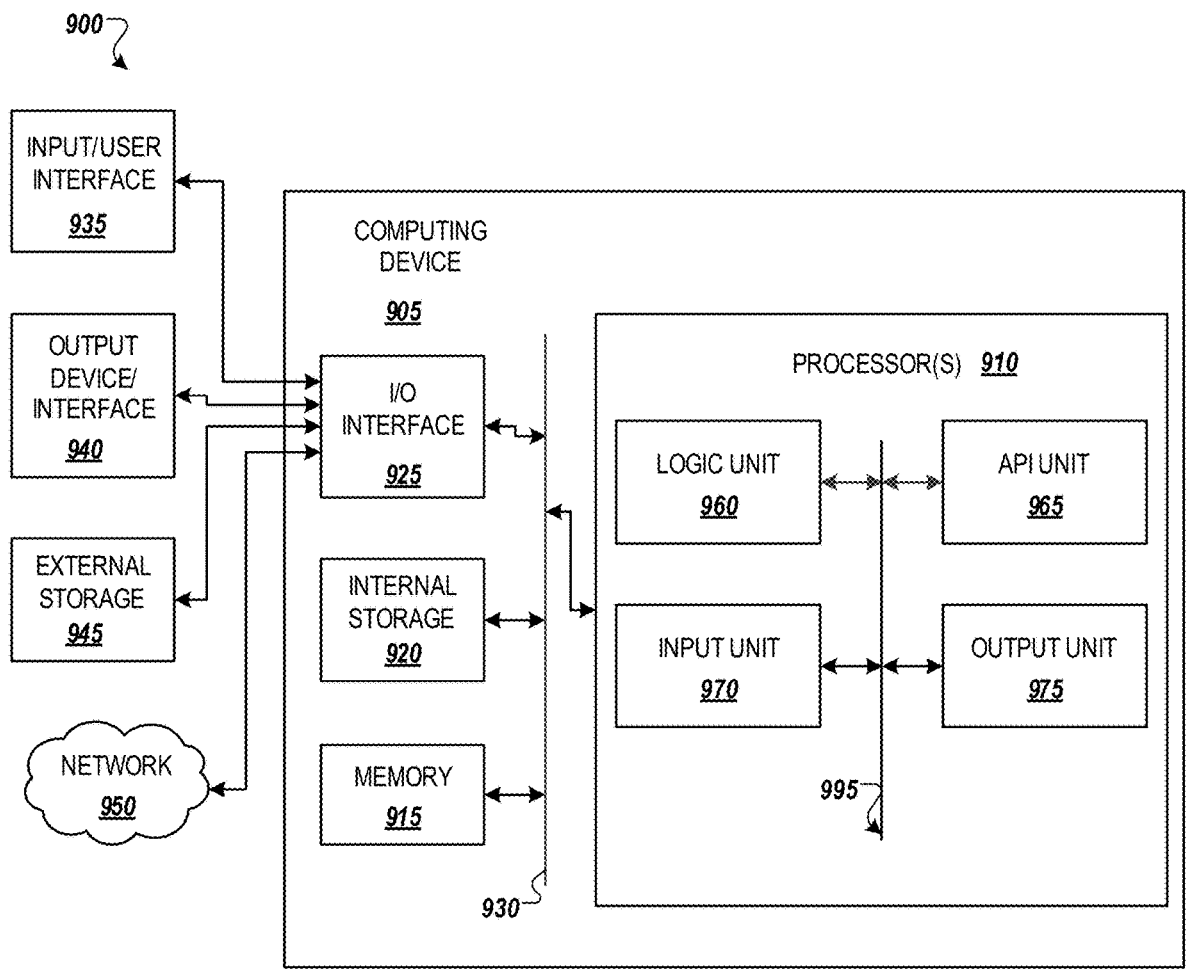
FIG. 9 illustrates an example computing environment with an example computer device suitable for use in some example implementations.

FIG. 9 illustrates an example computing environment with an example computer device suitable for use in some example implementations, such as a management apparatus 802 as illustrated in FIG. 8. Computer device 905 in computing environment 900 can include one or more processing units, cores, or processors 910, memory 915 (e.g., RAM, ROM, and/or the like), internal storage 920 (e.g., magnetic, optical, solid state storage, and/or organic), and/or I/O interface 925, any of which can be coupled on a communication mechanism or bus 930 for communicating information or embedded in the computer device 905. I/O interface 925 is also configured to receive images from cameras or provide images to projectors or displays, depending on the desired implementation.

Computer device 905 can be communicatively coupled to input/user interface 935 and output device/interface 940. Either one or both of input/user interface 935 and output device/interface 940 can be a wired or wireless interface and can be detachable. Input/user interface 935 may include any device, component, sensor, or interface, physical or virtual, that can be used to provide input (e.g., buttons, touch-screen interface, keyboard, a pointing/cursor control, microphone, camera, braille, motion sensor, optical reader, and/or the like). Output device/interface 940 may include a display, television, monitor, printer, speaker, braille, or the like. In some example implementations, input/user interface 935 and output device/interface 940 can be embedded with or physically coupled to the computer device 905. In other example implementations, other computer devices may function as or provide the functions of input/user interface 935 and output device/interface 940 for a computer device 905.

Examples of computer device 905 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computer device 905 can be communicatively coupled (e.g., via I/O interface 925) to external storage 945 and network 950 for communicating with any number of networked components, devices, and systems, including one or more computer devices of the same or different configuration. Computer device 905 or any connected computer device can be functioning as, providing services of, or referred to as a server, client, thin server, general machine, special-purpose machine, or another label.

I/O interface 925 can include, but is not limited to, wired and/or wireless interfaces using any communication or I/O protocols or standards (e.g., Ethernet, 802.11x, Universal System Bus, WiMax, modem, a cellular network protocol, and the like) for communicating information to and/or from at least all the connected components, devices, and network in computing environment 900. Network 950 can be any network or combination of networks (e.g., the Internet, local area network, wide area network, a telephonic network, a cellular network, satellite network, and the like).

Computer device 905 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computer device 905 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C#, Java, Visual Basic, Python, Perl, JavaScript, and others).

Processor(s) 910 can execute under any operating system (OS) (not shown), in a native or virtual environment and can be in the form of physical hardware processors such as Central Processing Units (CPUs) or a combination of software and hardware processors. One or more applications can be deployed that include logic unit 960, application programming interface (API) unit 965, input unit 970, output unit 975, and inter-unit communication mechanism 995 for the different units to communicate with each other, with the OS, and with other applications (not shown). The described units and elements can be varied in design, function, configuration, or implementation and are not limited to the descriptions provided.

In some example implementations, when information or an execution instruction is received by API unit 965, it may be communicated to one or more other units (e.g., logic unit 960, input unit 970, output unit 975). In some instances, logic unit 960 may be configured to control the information flow among the units and direct the services provided by API unit 965, input unit 970, output unit 975, in some example implementations described above. For example, the flow of one or more processes or implementations may be controlled by logic unit 960 alone or in conjunction with API unit 965. The input unit 970 may be configured to obtain input for the calculations described in the example implementations, and the output unit 975 may be configured to provide output based on the calculations described in example implementations.

Processor(s) 910 can be configured to determine a probability map of the sensor data from a database and a functional relationship between key performance indicators (KPIs) of the one or more processes and the sensor data as illustrated in FIGS. 4 and 5. In such an example implementation, the probability map is the probability of falling into a region R as described in FIGS. 4 and 5, and the functional relationship is the relation of KPI to the parameters of the one or more processes associated with region R. Processor(s) 910 can be configured to execute a search on the probability map to determine constrained and continuous ranges for the sensor data that optimize KPIs for the one or more processes based on the functional relationship as illustrated in FIG. 6 and FIG. 7. Processor(s) 910 can generate a recommendation for the one or more processes that fit within the constrained and continuous range of the sensor data as described with respect to FIG. 8.

In an example implementation, processor(s) 910 can be configured to execute the search on the probability map by executing a genetic search algorithm on the probability map as described with respect to element 603 of FIG. 6.

In an example implementation, processor(s) 910 can be configured to execute the search on the probability map by conducting a summation across probabilities of the probability map in comparison to an average of the KPI, which can be conducted, for example, through evaluating $E[y|x \in R]$ and Pr for a given region R, and identifying regions that maximize the average KPI based on the product of the probability summation of region R and the average KPI associated with region.

In an example implementation, processor(s) 910 is configured to determine the functional relationship between KPIs of the one or more processes and the sensor data by utilizing a parametric method to learn parameters indicative of the functional relationship based on historical data of the sensors, and generating the functional relationship based on known parameters and the learned parameters as illustrated in the machine learning implementations as described in FIG. 4 and element 402. Known parameters can involve the user defined parameters as described in FIG. 3, and learned parameters can involve the interpretable and implementable operating envelope identification as illustrated in FIG. 3.

In an example implementation, processor(s) 910 is configured to determine the functional relationship between KPIs by applying sample average approximation on historical data of the sensors to determine an average for the KPIs as illustrated in the process of FIG. 5.

In an example implementation, processor(s) 910 is configured to execute the search on the probability map to determine constrained and continuous ranges for the sensor data that optimize KPIs for the one or more processes based on the functional relationship by applying a penalty on the search for found ranges not being constrained or continuous as described in the process of FIG. 6 and element 602, and as illustrated in FIG. 7 and FIG. 3.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

Moreover, other implementations of the present application will be apparent to those skilled in the art from consideration of the specification and practice of the teachings of the present application. Various aspects and/or components of the described example implementations may be used singly or in any combination. It is intended that the specification and example implementations be considered as examples only, with the true scope and spirit of the present application being indicated by the following claims.

What is claimed is:

1. A method for a system involving a plurality of sensors monitoring one or more industrial processes facilitated by one or more industrial apparatuses, the sensors providing sensor data, the method comprising:

determining a probability map of the sensor data from a database and a functional relationship between key performance indicators (KPIs) of the one or more processes and the sensor data;

executing a search on the probability map to determine a constrained and continuous range for the sensor data that optimize KPIs for the one or more processes based on the functional relationship;

generating an operating envelope for the one or more industrial processes that imposes control of operation of the one or more industrial processes by the one or more industrial apparatuses to operate within the constrained and continuous range of the sensor data;

wherein the executing the search on the probability map comprises:

conducting a summation across probabilities of the probability map in comparison to an average of the KPIs;

applying a penalty on the search for found ranges not being constrained or continuous;

wherein the generating the operating envelope comprises optimizing an objective function within the constrained and continuous range of sensor data according to defined constraints.

2. The method of claim 1, wherein the executing the search on the probability map comprises executing a genetic search algorithm on the probability map.

3. The method of claim 1, wherein the determining the functional relationship between KPIs of the one or more processes and the sensor data comprises utilizing a parametric method to learn parameters indicative of the functional relationship based on historical data of the sensors, and generating the functional relationship based on known parameters and the learned parameters.

4. The method of claim 1, wherein the determining the functional relationship between KPIs comprises applying sample average approximation on historical data of the sensors to determine an average for the KPIs.

5. A non-transitory computer readable medium, storing instructions for a system involving a plurality of sensors monitoring one or more industrial processes facilitated by one or more industrial apparatuses, the sensors providing sensor data, the instructions comprising:

determining a probability map of the sensor data from a database and a functional relationship between key performance indicators (KPIs) of the one or more processes and the sensor data;

executing a search on the probability map to determine a constrained and continuous range for the sensor data that optimize KPIs for the one or more processes based on the functional relationship;

generating an operating envelope for the one or more industrial processes that imposes control of operation of the one or more industrial processes by the one or more industrial apparatuses to operate within the constrained and continuous range of the sensor data;

wherein the executing the search on the probability map comprises:

conducting a summation across probabilities of the probability map in comparison to an average of the KPIs; and applying a penalty on the search for found ranges not being constrained or continuous;

wherein the generating the operating envelope comprises optimizing an objective function within the constrained and continuous range of sensor data according to defined constraints.

6. The non-transitory computer readable medium of claim 5, wherein the executing the search on the probability map comprises executing a genetic search algorithm on the probability map.

7. The non-transitory computer readable medium of claim 5, wherein the determining the functional relationship between KPIs of the one or more processes and the sensor data comprises utilizing a parametric method to learn parameters indicative of the functional relationship based on historical data of the sensors, and generating the functional relationship based on known parameters and the learned parameters.

8. The non-transitory computer readable medium of claim 5, wherein the determining the functional relationship between KPIs comprises applying sample average approximation on historical data of the sensors to determine an average for the KPIs.

9. A system comprising:

a plurality of sensors monitoring one or more industrial processes facilitated by one or more industrial apparatuses, the sensors providing sensor data; and a processor, configured to:

determine a probability map of the sensor data from a database and a functional relationship between key performance indicators (KPIs) of the one or more processes and the sensor data;

execute a search on the probability map to determine a constrained and continuous range for the sensor data that optimize KPIs for the one or more processes based on the functional relationship;

generate an operating envelope for the one or more industrial processes that imposes control of operation of the one or more industrial processes by the one or more industrial apparatuses to operate within the constrained and continuous range of the sensor data;

wherein the processor is configured to execute the search on the probability map by:

conducting a summation across probabilities of the probability map in comparison to an average of the KPIs; and applying a penalty on the search for found ranges not being constrained or continuous;

wherein the processor is configured to generate the operating envelope by optimizing an objective function within the constrained and continuous range of sensor data according to defined constraints.

10. The system of claim 9, wherein the processor is configured to execute the search on the probability map by executing a genetic search algorithm on the probability map.

11. The system of claim 9, wherein the processor is configured to determine the functional relationship between KPIs of the one or more processes and the sensor data by utilizing a parametric method to learn parameters indicative of the functional relationship based on historical data of the sensors, and generating the functional relationship based on known parameters and the learned parameters.

12. The system of claim 9, wherein the processor is configured to determine the functional relationship between KPIs by applying sample average approximation on historical data of the sensors to determine an average for the KPIs.

* * * * *